No. 647,436. Patented Apr. 10, 1900.
M. A. BECK.
AUTOMATIC BRAKE FOR ELECTRIC MOTORS.
(Application filed Jan. 9, 1899.)
(No Model.) 2 Sheets—Sheet 1.

No. 647,436. Patented Apr. 10, 1900.
M. A. BECK.
AUTOMATIC BRAKE FOR ELECTRIC MOTORS.
(Application filed Jan. 9, 1899.)
(No Model.) 2 Sheets—Sheet 2.

Witnesses:
Geo. W. Young.
Chas. L. Goss.

Inventor:
Matthias A. Beck,

UNITED STATES PATENT OFFICE.

MATTHIAS A. BECK, OF MILWAUKEE, WISCONSIN, ASSIGNOR TO PAWLING & HARNISCHFEGER, OF SAME PLACE.

AUTOMATIC BRAKE FOR ELECTRIC MOTORS.

SPECIFICATION forming part of Letters Patent No. 647,436, dated April 10, 1900.

Application filed January 9, 1899. Serial No. 701,589. (No model.)

*To all whom it may concern:*

Be it known that I, MATTHIAS A. BECK, a citizen of the United States, residing at Milwaukee, in the county of Milwaukee and State of Wisconsin, have invented certain new and useful Improvements in Automatic Brakes for Electric Motors, of which the following is a specification, reference being had to the accompanying drawings, forming a part thereof.

The main object of my invention is to promptly and automatically stop an electric motor whenever the current by which the motor is actuated is cut off or abnormally reduced.

It consists of certain novel features of construction and combinations of parts hereinafter particularly described and claimed.

In the accompanying drawings like letters designate the same parts in both figures.

Figure 1:
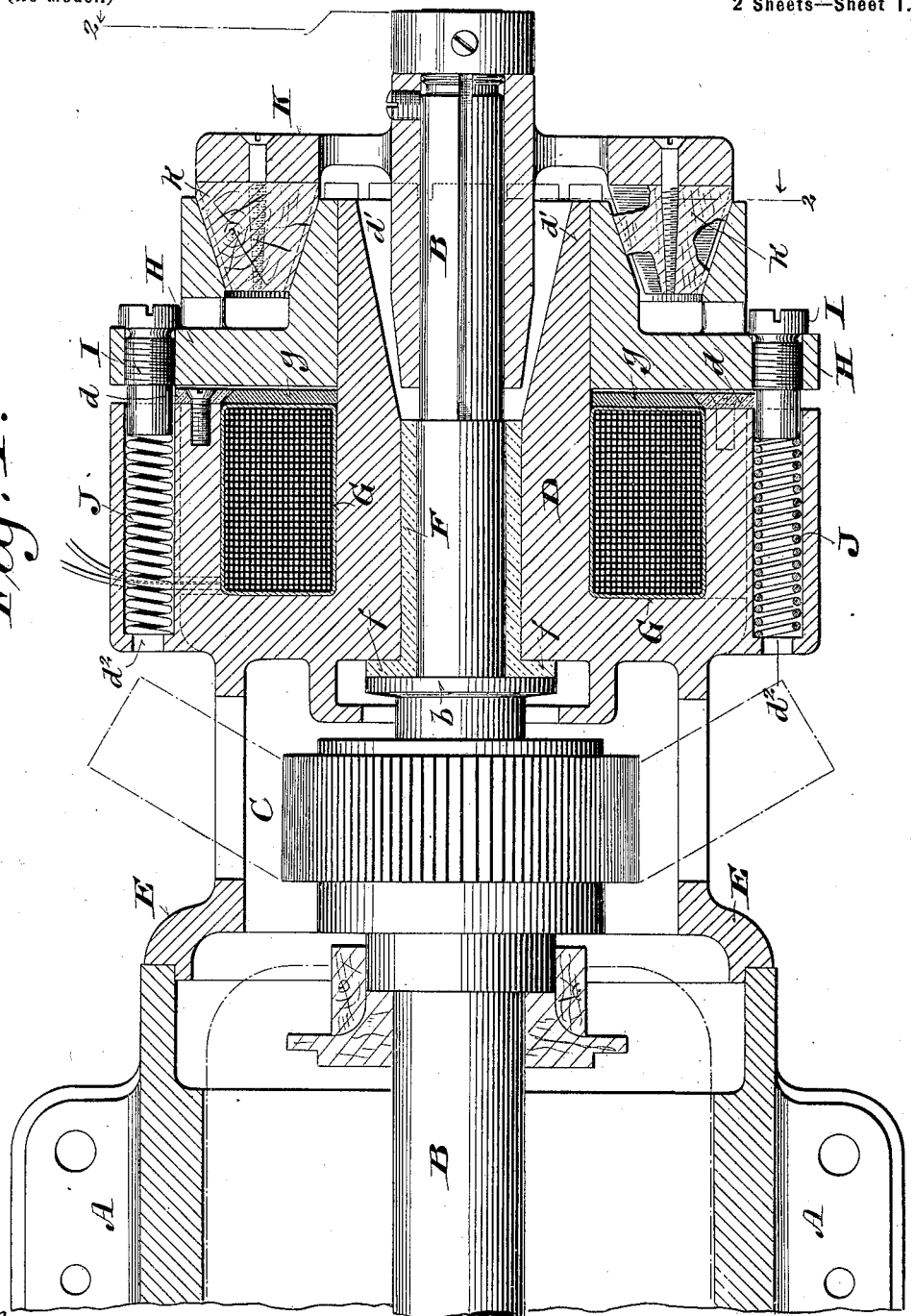
Figure 2:
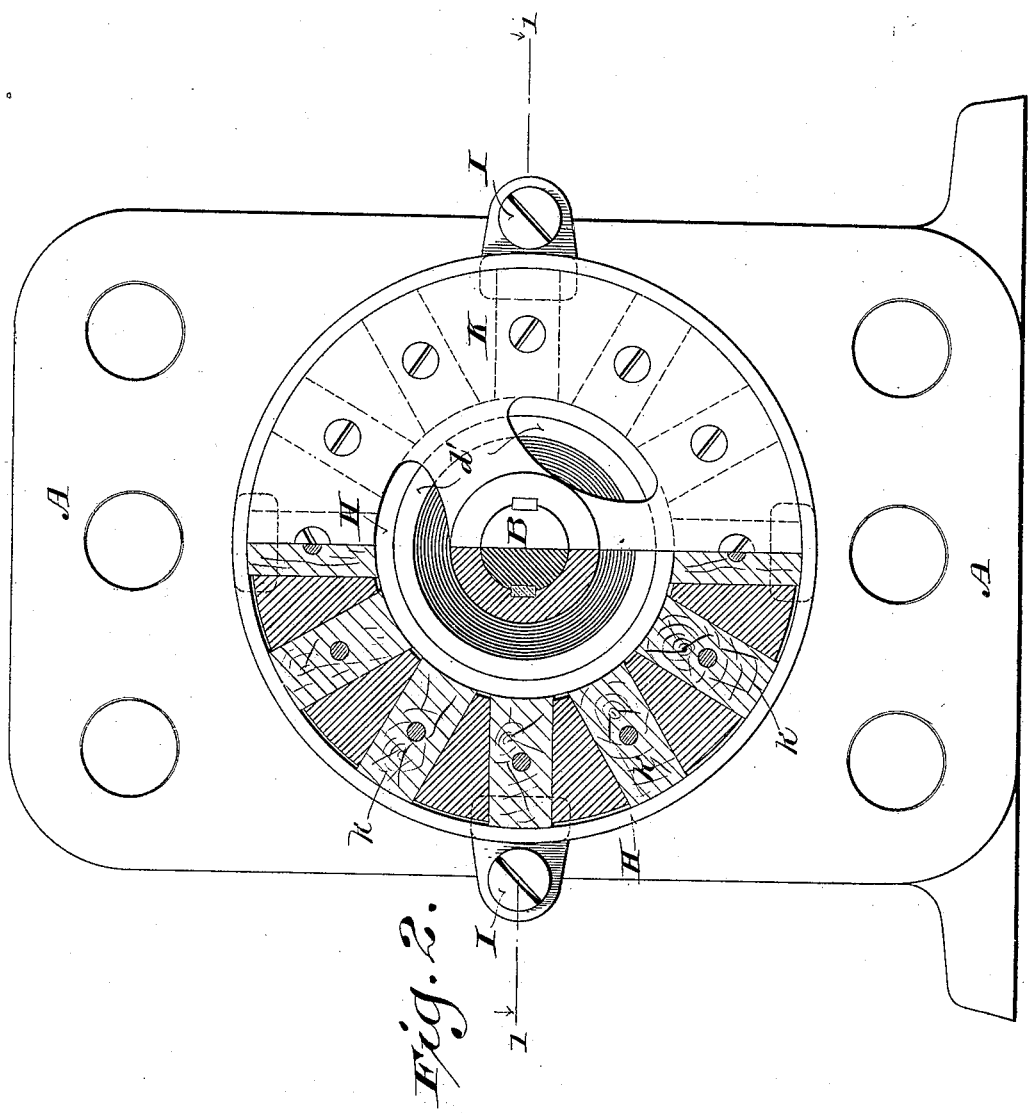

Figure 1 is a horizontal section in a plane indicated by the line 1 1, Fig. 2, of a motor-brake embodying my invention; and Fig. 2 is a partial elevation as viewed from the right with reference to Fig. 1 and a partial vertical cross-section in a plane indicated by the line 2 2, Fig. 1.

A designates a portion of the frame of an electric motor, B the armature-shaft, and C the commutator of the motor.

D is the core of an electromagnet, which may be conveniently cast or formed integrally with the head E of the motor-frame. It is formed with a central opening, in which is fitted a bushing F, through which the armature-shaft passes and in which it has a bearing. This bushing is preferably formed at its inner end with an outwardly-projecting flange $f$, which bears against a shoulder or collar $b$, formed on or attached to the armature-shaft to receive the end thrust of the brake when it is applied to stop the motor. The magnet-core D is formed around the central opening therein with an annular recess, in which is placed the coil or winding G of the magnet. This coil is covered and held in place at the outer end of the magnet by a ring or washer $g$, of fiber or other suitable insulating material, which is beveled on its outer edge and secured to the magnet by a metal ring $d$, beveled on its inner edge to fit over the outer beveled edge of the ring $g$ and screwed or otherwise fastened to the outer shell of the magnet-core.

H is the armature of the electromagnet. It is of annular form and fitted to slide lengthwise of the armature-shaft upon a cylindrical extension $d'$ of the magnet-core D. It is held from rotation by screws I, which are threaded in ears formed on its periphery and project loosely into sockets $d^2 d^2$, formed in line therewith and parallel with the armature-shaft in the outer part of the core D. Spiral springs J, inserted in these sockets, press outwardly against the ends of said screws, tending to force said armature away from the magnet. In the outer end of the armature H is formed a V-shaped groove or a recess having outwardly-diverging friction-faces.

K is a wheel or disk mounted and fixed upon the projecting end of the armature-shaft B outside of the armature H. It is formed on the inside with a V-shaped rim having radial recesses therein, in which are fitted and secured by screws or other suitable means V-shaped friction-blocks $k$, of wood or other suitable material, corresponding in shape and position with the opposite recess or groove in the armature H. The friction-wheel K is preferably formed inside of its rim through its web with ventilating-openings, and radial ventilating-openings are also formed through the outside of the armature H into the bottom of the groove or recess therein to prevent overheating of and injury to the brake by the friction between its engaging surfaces.

The coil G of the magnet is connected with the motor-circuit in series or in shunt with the motor or in any other suitable manner, so that when current flows through the motor the magnet will be energized and when the current ceases the magnet will be deënergized.

The springs J are made of sufficient strength to hold the armature H against the friction blocks or shoes of the wheel K with sufficient force to promptly stop the motor when the magnet is shut off, and the magnet is made of sufficient strength to overcome the tension of said springs and to retract the armature H out of engagement with the friction-wheel K when the current is turned on through the magnet and motor.

It is obvious that the engaging parts of the brake may be reversed—that is, the wheel K may be formed with a groove similar to that shown in the armature, and the armature may be provided with correspondingly-shaped friction blocks or shoes, and in either case the number and arrangement of the friction shoes or blocks may be varied, and in place of the wheel K with a continuous rim separate arms provided with segmental shoes or blocks may be substituted. In short, the minor details of construction and arrangement of parts may be variously modified without affecting the principle and mode of operation of the brake and within the spirit and intended scope of my invention.

The brake herein shown and described is particularly designed for use in connection with electric motors employed for raising and lowering heavy weights, as in hoists, cranes, and elevators, and also in connection with automatic load-brakes, by means of which the descent of the load is automatically controlled by the operation of the motor itself, so that when the actuating-current is cut off from the motor it will be automatically and instantly stopped and the movement of the load instantly arrested.

I claim—

1. The combination with an electric-motor armature-shaft, of an electromagnetic brake comprising two parts provided with opposing friction-faces of which one is fixed upon and rotates with said shaft, and the other is non-rotatable and movable axially, an electromagnet arranged when energized to hold the axially-movable part out of engagement with the other and means tending to hold the axially-movable part of the brake in contact with the rotary part, substantially as and for the purposes set forth.

2. The combination with the armature-shaft of an electric motor, of an electromagnetic brake comprising two parts one fixed upon said shaft and the other stationarily supported independently thereof, means tending to force one part into engagement with the other, and an electromagnet connected with the motor-circuit and arranged when energized to separate said parts and hold them out of engagement, substantially as and for the purposes set forth.

3. The combination with the armature-shaft of an electric motor, of an electromagnetic brake comprising an annular magnet through which the armature-shaft extends, held from rotation by attachment to a fixed support and having its coils connected with the motor-circuit, a rotary friction ring or shoe fixed upon the armature-shaft, an axially-movable non-rotatable friction ring or shoe interposed between said magnet and the rotary friction ring or shoe on the armature-shaft, and means tending to force said axially-movable ring or shoe into engagement with the rotary ring or shoe, substantially as and for the purposes set forth.

4. The combination with the armature-shaft of an electric motor of a ring or wheel fixed upon said shaft and provided on one side with wedge-shaped friction blocks or shoes arranged in a circle concentric with the armature-shaft, an axially-movable armature-ring formed or provided with an annular wedge-shaped groove or recess opposite said friction blocks or shoes, and held from rotation by connection with a fixed support, means tending to force and hold said armature-ring in engagement with said friction blocks or shoes and an electromagnet connected with the motor-circuit and arranged when energized to hold said armature out of engagement with said friction blocks or shoes, substantially as and for the purposes set forth.

5. The combination with the armature-shaft of an electric motor, of an annular electromagnet surrounding said armature-shaft, attached to a fixed support and having its winding connected with the motor-circuit, an axially-movable armature and friction-ring connected with the magnet and held from turning by guides parallel with the armature-shaft, a rotary friction ring or wheel fixed on the armature-shaft, and means tending to force said armature and friction-ring away from the magnet into engagement with the rotary friction ring or wheel on the armature-shaft, substantially as and for the purposes set forth.

6. The combination with the armature-shaft of an electric motor, of an annular electromagnet through which the armature-shaft extends and in which it has a bearing, an annular armature mounted and movable axially upon the extended core or pole of said magnet and provided with a friction-face, screws threaded in said armature parallel with its axis and projecting loosely into sockets in the magnet, springs held in said sockets and bearing against the said screws, and a wheel or ring fixed on said armature-shaft and provided with a friction-face opposing that of said armature, the coils of said magnet being connected with the motor-circuit, substantially as and for the purposes set forth.

7. The combination with an electric-motor armature-shaft of a stationary annular electromagnet surrounding said shaft and having its coils connected with the motor-circuit, a friction ring or wheel fixed on the armature-shaft and formed with a radially slotted or recessed rim projecting from one side thereof, wedge-shaped friction-blocks secured in the slots or recesses of said rim, an axially-movable non-rotatable annular armature interposed between said friction ring or wheel and provided with an annular wedge-shaped friction-groove corresponding with said wedge-shaped friction-blocks, and means arranged to move said armature into engagement with said friction-wheel when said magnet is deenergized, substantially as and for the purposes set forth.

8. An automatic brake consisting of two frictional parts one of which is fixed upon and turns with the armature-shaft of a motor, the other part being movable axially and non-rotatable, means tending to hold the parts of the brake in engagement with each other, and an electromagnet the core of which forms a part of the motor-head, having its winding connected with the motor-circuit, and arranged when energized to attract and hold the axially-movable part of the brake out of contact with the other part, substantially as and for the purposes set forth.

In witness whereof I hereto affix my signature in presence of two witnesses.

MATTHIAS A. BECK.

Witnesses:
   CHAS. L. GOSS,
   M. L. EMERY.